(12) United States Patent
Yamada et al.

(10) Patent No.: US 9,043,941 B2
(45) Date of Patent: May 26, 2015

(54) BIOMETRIC AUTHENTICATION DEVICE, BIOMETRIC AUTHENTICATION SYSTEM, BIOMETRIC AUTHENTICATION METHOD, AND RECORDING MEDIUM

(71) Applicant: FUJITSU LIMITED, Kawasaki (JP)

(72) Inventors: Shigefumi Yamada, Sagamihara (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 58 days.

(21) Appl. No.: 13/783,867

(22) Filed: Mar. 4, 2013

(65) Prior Publication Data

US 2013/0263282 A1     Oct. 3, 2013

(30) Foreign Application Priority Data

Mar. 27, 2012  (JP) ................................. 2012-071747

(51) Int. Cl.
    G06F 21/32      (2013.01)
    G06K 9/00       (2006.01)
(52) U.S. Cl.
    CPC ............ *G06F 21/32* (2013.01); *G06K 9/00026* (2013.01)
(58) Field of Classification Search
    None
    See application file for complete search history.

(56) References Cited

U.S. PATENT DOCUMENTS

| 6,047,079 A * | 4/2000 | Uchida .......................... 382/124 |
| 2005/0047633 A1* | 3/2005 | Morguet ....................... 382/124 |
| 2005/0097037 A1* | 5/2005 | Tibor ............................ 705/39 |
| 2007/0217659 A1* | 9/2007 | Harada .......................... 382/115 |
| 2008/0013805 A1* | 1/2008 | Sengupta et al. ............. 382/124 |
| 2008/0077359 A1 | 3/2008 | Ito |
| 2011/0044513 A1* | 2/2011 | McGonagle et al. ......... 382/124 |
| 2011/0185401 A1* | 7/2011 | Bak et al. ........................... 726/5 |
| 2012/0246739 A1* | 9/2012 | Mebed ............................. 726/28 |

FOREIGN PATENT DOCUMENTS

| JP | 2006-79537 | | 3/2006 |
| JP | 200679537 A | * | 3/2006 |
| JP | 4575731 | | 8/2010 |

OTHER PUBLICATIONS

Machine translation of Japanese patent application 2006-079537.*
Partial translation of Japanese patent application 2006-079537.*
Extended European search report dated Jul. 11, 2013 in European Patent Application No. 13157568.0-1956.

* cited by examiner

*Primary Examiner* — Aravind Moorthy
*Assistant Examiner* — Jason Plotkin
(74) *Attorney, Agent, or Firm* — Staas & Halsey LLP

(57) ABSTRACT

A biometric authentication device includes a processor to execute an operation including: obtaining biometric information from a user; creating verification characteristic data from the biometric information; verifying registered characteristic data registered in a storage device with the verification characteristic data and determining whether the user is a true user; permitting execution of re-authentications up to a predetermined number of times when the user is determined to not be the true user; managing the verification characteristic data by storing the verification characteristic data in an existing group or by creating a new group and storing the verification characteristic data therein, when the user is determined to not be the true user; determining whether the user is a false user based on the number of groups; and limiting the execution of re-authentications by the user when the user is determined to be the false user.

14 Claims, 13 Drawing Sheets

FIG. 4A     FIG. 4B     FIG. 4C
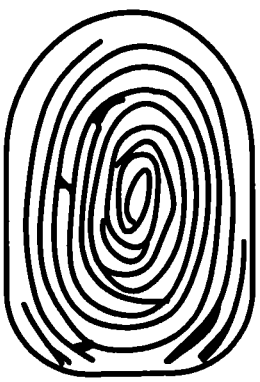
FIG. 4D

FIG. 5A
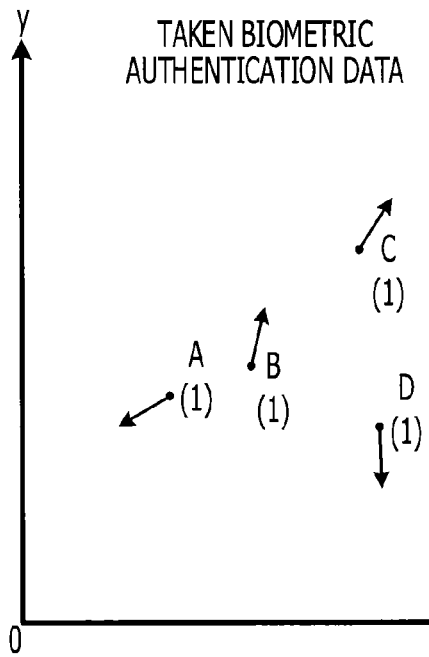
TAKEN BIOMETRIC AUTHENTICATION DATA
FIG. 5B
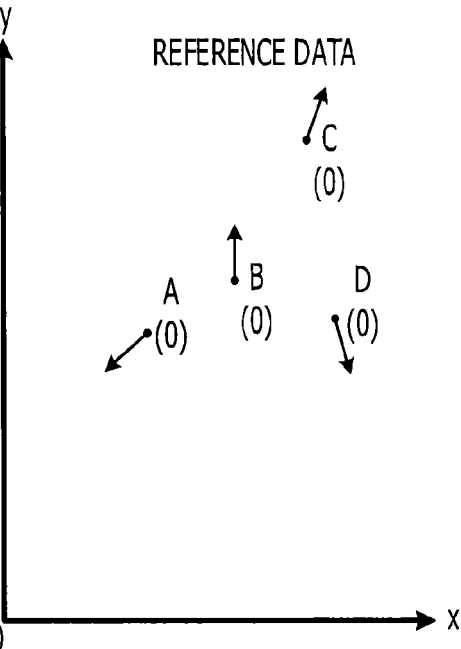
REFERENCE DATA
FIG. 5C
| CHARACTERISTIC POINTS | COORDINATES (x, y) | DIRECTIONS (°) |
|---|---|---|
| REFERENCE DATA A (0) | (50, 99) | 222 |
| REFERENCE DATA B (0) | (80, 117) | 90 |
| REFERENCE DATA C (0) | (105, 165) | 70 |
| REFERENCE DATA D (0) | (115, 104) | 285 |
| BIOMETRIC AUTHENTICATION DATA A (1) | (51, 78) | 210 |
| BIOMETRIC AUTHENTICATION DATA B (1) | (79, 88) | 77 |
| BIOMETRIC AUTHENTICATION DATA C (1) | (117, 128) | 57 |
| BIOMETRIC AUTHENTICATION DATA D (1) | (123, 67) | 272 |

FIG. 8

| ID INFORMATION | VERIFICATION CHARACTERISTIC DATA | STORAGE DATE AND TIME | STORAGE UNIT (GROUP NAME) |
|---|---|---|---|
| 001 | DATA 1 | 2011/08/030 8:00:00 | GROUP 1 |
| 002 | DATA 2 | 2011/08/030 9:00:00 | GROUP 2 |
| 002 | DATA 3 | 2011/08/030 9:00:10 | GROUP 2 |
| 002 | DATA 4 | 2011/08/030 9:01:00 | GROUP 3 |
| 002 | DATA 5 | 2011/08/030 9:01:10 | GROUP 3 |
| ... | ... | ... | ... |

FIG. 9

| ID INFORMATION | VERIFICATION CHARACTERISTIC DATA | STORAGE DATE AND TIME | STORAGE UNIT (GROUP NAME) |
|---|---|---|---|
| 001 | DATA 1 | 2011/08/030 9:00:00 | GROUP 1 |
| 002 | DATA 2 | 2011/08/030 9:00:20 | GROUP 1 |
| 003 | DATA 3 | 2011/08/030 9:00:40 | GROUP 1 |
| 004 | DATA 4 | 2011/08/030 9:01:00 | GROUP 1 |
| 005 | DATA 5 | 2011/08/030 9:01:20 | GROUP 1 |
| ... | ... | ... | ... |

FIG. 10

| ID INFORMATION | VERIFICATION CHARACTERISTIC DATA | STORAGE DATE AND TIME | STORAGE UNIT (GROUP NAME) |
|---|---|---|---|
| 001 | DATA 1 | 2011/08/030 8:00:00 | GROUP 1 |
| 001 | DATA 2 | 2011/08/030 9:00:00 | GROUP 1 |
| 001 | DATA 3 | 2011/08/030 9:00:10 | GROUP 2 |
| 001 | DATA 4 | 2011/08/030 9:01:00 | GROUP 2 |
| 002 | DATA 5 | 2011/08/030 8:00:10 | GROUP 3 |
| 002 | DATA 6 | 2011/08/030 8:00:20 | GROUP 3 |
| 002 | DATA 7 | 2011/08/030 9:00:30 | GROUP 3 |
| 002 | DATA 8 | 2011/08/030 9:01:10 | GROUP 4 |
| 002 | DATA 9 | 2011/08/030 9:01:20 | GROUP 4 |
| ... | ... | ... | ... |

FIG. 13

| PC INFORMATION | ID INFORMATION | VERIFICATION CHARACTERISTIC DATA | STORAGE DATE AND TIME | STORAGE UNIT (GROUP NAME) |
|---|---|---|---|---|
| PC1 | 001 | DATA 1 | 2011/08/030 8:00:00 | GROUP 1 |
| PC1 | 001 | DATA 2 | 2011/08/030 9:00:00 | GROUP 1 |
| PC1 | 001 | DATA 3 | 2011/08/030 9:00:10 | GROUP 2 |
| PC1 | 001 | DATA 4 | 2011/08/030 9:01:00 | GROUP 2 |
| PC1 | 002 | DATA 5 | 2011/08/030 8:00:10 | GROUP 3 |
| PC1 | 002 | DATA 6 | 2011/08/030 8:00:20 | GROUP 3 |
| PC1 | 002 | DATA 7 | 2011/08/030 9:00:30 | GROUP 3 |
| PC1 | 002 | DATA 8 | 2011/08/030 9:01:10 | GROUP 4 |
| PC1 | 002 | DATA 9 | 2011/08/030 9:01:20 | GROUP 4 |
| PC2 | 003 | DATA 10 | 2011/08/030 8:00:10 | GROUP 1 |
| PC2 | 003 | DATA 11 | 2011/08/030 8:00:20 | GROUP 1 |
| PC2 | 003 | DATA 12 | 2011/08/030 9:00:30 | GROUP 1 |
| PC2 | 003 | DATA 13 | 2011/08/030 9:01:10 | GROUP 2 |
| PC2 | 003 | DATA 14 | 2011/08/030 9:01:20 | GROUP 2 |
| ... | ... | ... | ... | ... |

BIOMETRIC AUTHENTICATION DEVICE, BIOMETRIC AUTHENTICATION SYSTEM, BIOMETRIC AUTHENTICATION METHOD, AND RECORDING MEDIUM

CROSS-REFERENCE TO RELATED APPLICATION(S)

This application is based upon and claims the benefit of priority of the prior Japanese Patent Application No. 2012-071747, filed on Mar. 27, 2012, the entire contents of which are incorporated herein by reference.

FIELD

The embodiments discussed herein are related to a biometric authentication device, a biometric authentication system, a biometric authentication method, and a recording medium.

BACKGROUND

Recently, biometric authentication using the biometric information of humans is widely used in computer security for authentication that is more reliable than the conventionally used ID cards and passwords. Fingerprints, faces, irises, retinas, veins, palm shape, DNA, voice, signatures, ear auricles and the like are used as biometric information for biometric authentication. Among these methods, the practical application of biometric authentication technology mounted in mobile telephones and notebook PCs using fingerprints has advanced the most.

False user acceptance errors in which the authentication is mistakenly determined despite the user being a false user occur stochastically in biometric authentication. Aiming to stochastically cause a false acceptance error by attempting to increase the frequency of false acceptance (so-called "brute force attacks") by using a huge amount of biometric information is conceivable.

To reduce brute force attacks, the number of authentication re-tries over a fixed time period is generally limited for multiple errors in authentication in password authentication and the like.

Conversely, a case may occur in biometric authentication in which an authentication failure (true user refusal) may occur despite the user being the true user due to a variation in the obtained biometric information or environmental changes during authentication, and the true user is authenticated after several attempts during authentication. Thus, when an authentication error frequency limit for reducing brute force attacks is applied as-is to biometric authentication, there may be users who have difficulty being authenticated thus reducing the convenience for the user.

When storing biometric information of a failed authentication and the biometric information input at the time of the authentication failure demonstrates sameness with previously input biometric information, the number of authentication errors is not counted as authentication re-tries from the same location of the user, and the number of authentication errors is counted when sameness is not demonstrated. Limiting the authentication re-tries when the limitation has been reached is discussed in, for example, Japanese Laid-open Patent Publication No. 2006-79537.

SUMMARY

According to an aspect of the invention, a biometric authentication device includes a memory, and a processor to execute an operation by executing a program stored in the memory, the operation including: obtaining biometric information from a user; creating verification characteristic data from the biometric information; verifying registered characteristic data registered in a storage device with the verification characteristic data and determining whether the user is a true user; permitting execution of re-authentications up to a predetermined number of times when the user is determined to not be the true user; managing the verification characteristic data by storing the verification characteristic data used in the verifying in an existing group, or by creating a new group and storing the verification characteristic data used in the verifying therein, when the user is determined to not be the true user; determining whether the user is a false user based on the number of groups; and limiting the execution of re-authentications by the user when the user is determined to be the false user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A to 4C are elevations of fingerprints;

FIG. 4D is an enlargement illustrating characteristic points of a fingerprint;

FIG. 5A is a characteristic diagram illustrating features of sampled biometric authentication data;

FIG. 5B is a characteristic diagram illustrating features of reference data;

FIG. 5C is a comparison of the characteristics of FIGS. 5A and 5B;

FIG. 8 is a management table in a storage unit according to a second modified example of the first embodiment;

FIG. 9 is a management table (1) in a storage unit according to a third modified example of the first embodiment;

FIG. 10 is a management table (2) in a storage unit according to a third modified example of the first embodiment;

FIG. 13 illustrates a management table of a storage unit according to a second embodiment.

DESCRIPTION OF EMBODIMENTS

When the user is not accustomed to the operations involved in biometric authentication, the range of input biometric information is different and the user's identity may not be recognized during re-authentication even with continuous biometric information. Further, multiple locations of biometric information are registered beforehand when assuming a case in which authentication is difficult, and switching input locations for biometric information is commonly performed when an authentication failure occurs. For example, the right index finger and the left index finger are registered beforehand when using fingerprint authentication, or the right hand and the left hand are registered beforehand when using palm vein authentication.

Accordingly, in a technique for determining sameness with previously input biometric information, there is a problem in that in the above case, the number of authentication re-tries becomes limited despite the actual user attempting the authentication due to the number of authentication failures being counted and the count limit being reached.

First Embodiment

Figure 1:
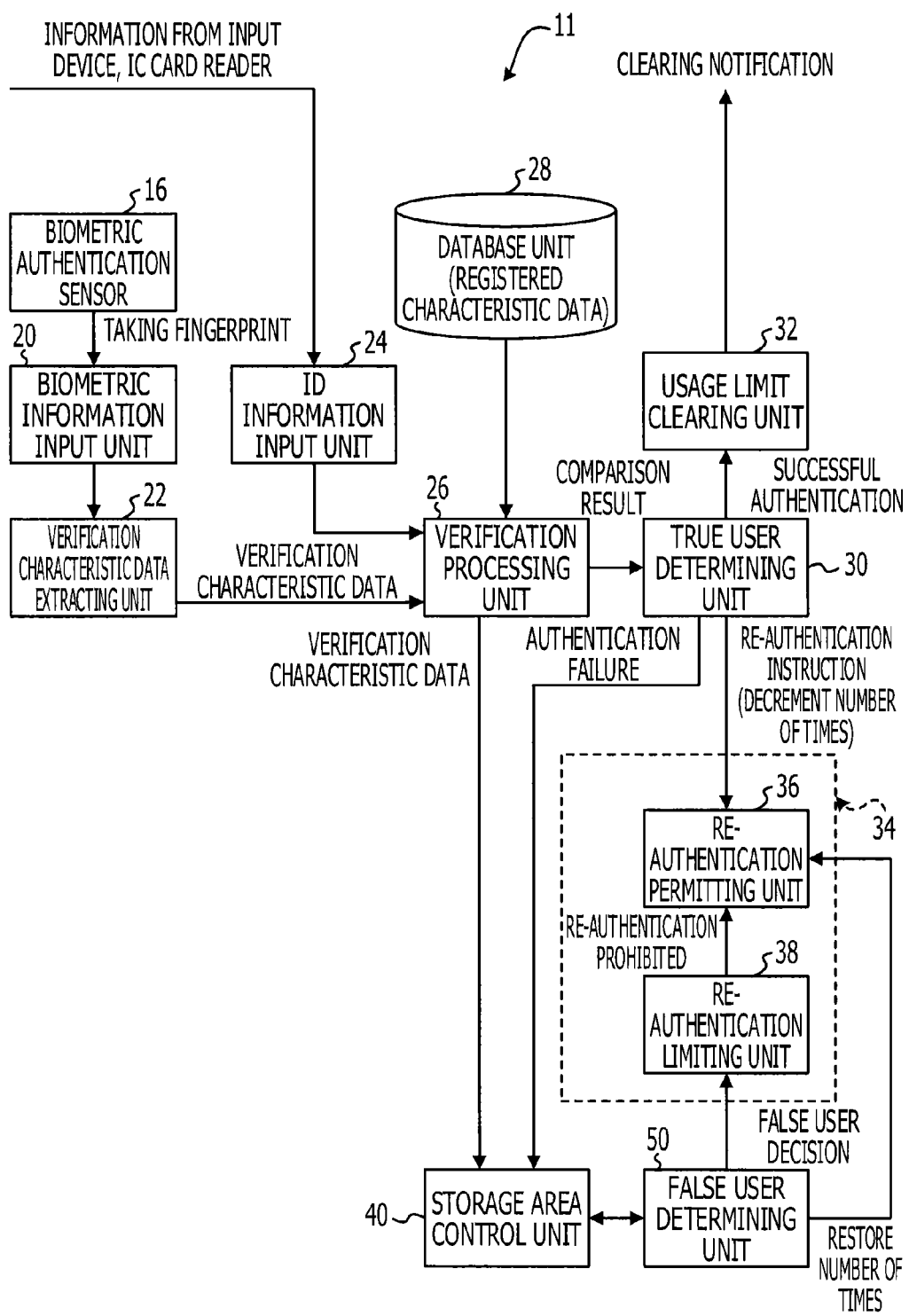
FIG. 1 is a block diagram of functions of a biometric authentication device according to a first embodiment that uses biometric authentication information taken by a biometric authentication sensor to conduct biometric authentication for a PC.

FIG. 1 is a biometric authentication device 11 according to the first embodiment.

The biometric authentication device 11 includes a biometric authentication sensor 16, a biometric information input unit 20, a verification characteristic data extracting unit 22, an ID information input unit 24, a verification processing unit 26, and a database unit 28. The biometric authentication device 11 in FIG. 1 further includes a true user determining unit 30, a usage limit clearing unit 32, a re-authentication control unit 34, a re-authentication permitting unit 36, a re-authentication limiting unit 38, a storage area control unit 40, and a false user determining unit 50.

Figure 2:
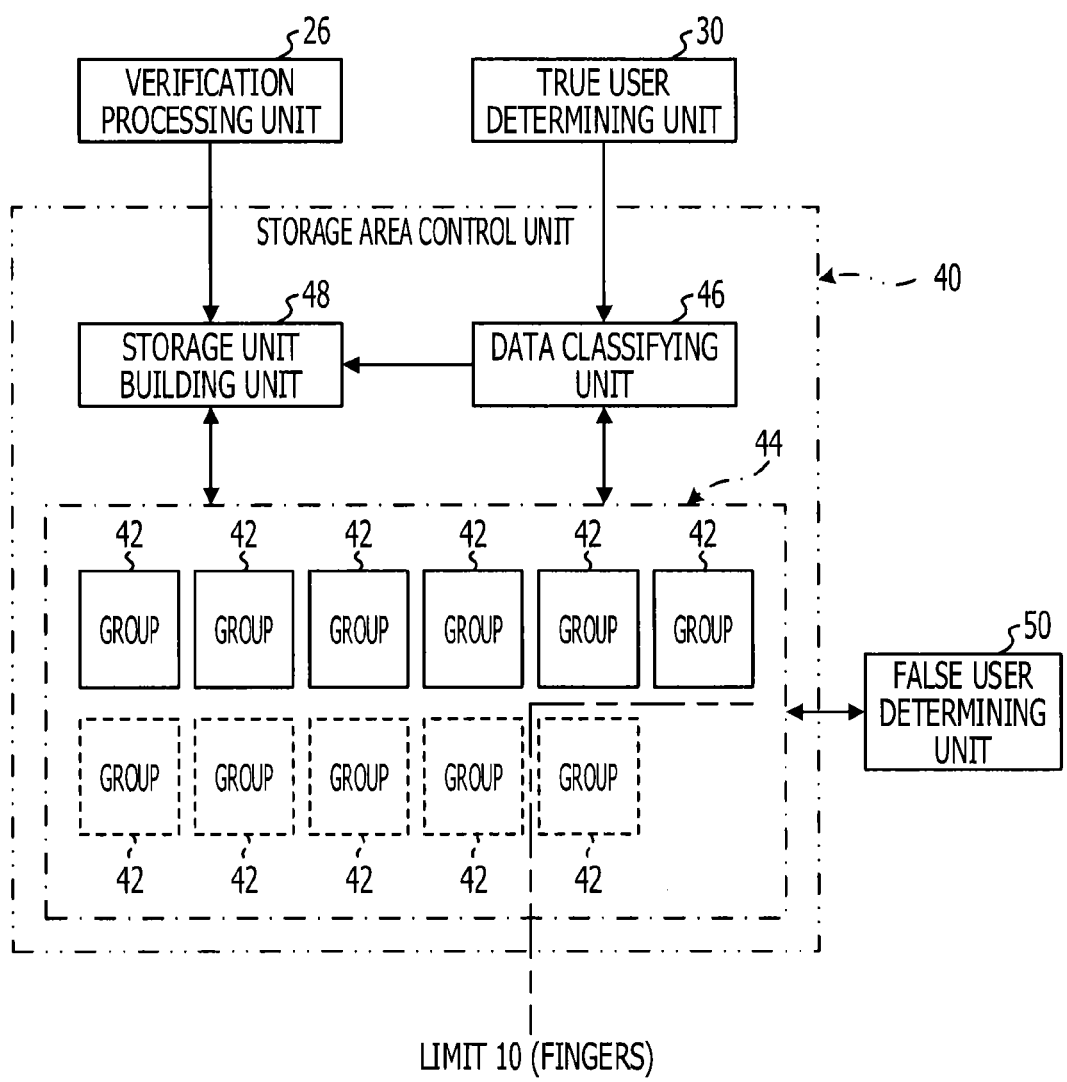
FIG. 2 is a functional block diagram of details of a storage area control unit in FIG. 1.

As illustrated in FIG. 2, the storage area control unit 40 includes groups 42, a storage unit 44, a data classifying unit 46, and a storage unit building unit 48.

The first embodiment assumes that a plurality of users who conduct one-to-one authentication are sharing the device. The biometric authentication sensor 16 is described as provided outside of the biometric authentication device 11, but may also be installed in the biometric authentication device 11.

In addition to taking fingerprints by the biometric authentication sensor 16, the biometric authentication device 11 may encourage the input of user identification information for identifying the user through an input device 10F.

The user identification information is ID information such as a user name, password and the like, (collectively referred to as "ID information" hereinbelow) assigned to each user using the device. The ID information may be read when the user inserts an ID card owned by the user in a card reader (not illustrated) coupled to an I/F 10H.

The biometric authentication sensor 16 is coupled to the biometric information input unit 20.

The biometric information input unit 20 transmits biometric information (in this case, a fingerprint image) taken by the biometric authentication sensor 16 to the verification characteristic data extracting unit 22. The verification characteristic data extracting unit 22 extracts verification characteristic data used in verification processing from the fingerprint image that is the biometric information. The verification characteristic data is, for example, fingerprint minutiae (characteristic points) information or a characteristic image extracted from a portion of the biometric information (fingerprint image). Details of fingerprint authentication are explained below with reference to FIGS. 4 and 5.

The ID information input unit 24 is configured to receive the ID information read from key inputs or from the card reader.

The verification characteristic data extracted by the verification characteristic data extracting unit 22 and the ID information input into the ID information input unit 24 are transmitted to the verification processing unit 26. The verification processing unit 26 is coupled to the database unit 28. Characteristic data for identifying a user who is allowed to use the device beforehand and registered characteristic data for verifying with the verification characteristic data is stored in the database unit 28. The database unit 28 is, for example, a storage device such as a hard disc drive (HDD), or a portable storage medium.

Processing to verify the verification characteristic data and the registered characteristic data is conducted by the verification processing unit 26. That is, the verification processing unit 26 obtains the registered characteristic data associated with the ID information from the database unit 28. The verification processing unit 26 verifies the registered characteristic data and the verification characteristic data and calculates a level of similarity that indicates that as a numerical value indicating a degree of verification increases, a probability that the user who registered the registered characteristic data is the same user as the user who input the biometric information increases. The verification processing unit 26 is able to use, for example, minutiae matching or pattern matching. Instead of the level of similarity, implementation of a configuration having a similar effect is possible when using distance information in which the probability that the user is the same user increases as the numerical value decreases.

The verification processing unit 26 is coupled to the true user determining unit 30 and transmits information of the verification result (herein, distance information or level of similarity that indicates the verification result) by the verification processing unit 26 to the true user determining unit 30.

When a new registration occurs, the verification characteristic data is associated with the ID information and stored in the database unit 28.

The true user determining unit 30 compares the distance information or the level of similarity that is the verification result to a certain previously set threshold to determine whether the user is the true user.

When using the level of similarity, the true user determining unit 30 determines that the user is true and the authentication is successful when the level of similarity is equal to or greater than the threshold, and the true user determining unit 30 determines that the user is false and the authentication fails when the level of similarity is less than the threshold. Conversely, when using the distance information, the true user determining unit 30 determines that the user is true and the authentication is successful when the level of similarity is equal to or less than the threshold, and the true user determining unit 30 determines that the user is false and the authentication fails when the level of similarity is greater than the threshold.

When the authentication is successful, the true user determining unit 30 transmits authentication success information to the usage limit clearing unit 32. The usage limit clearing unit 32 transmits to all the units of the biometric authentication device 11 a notification to clear a usage limit for requests by the user.

The true user determining unit 30 is coupled to the re-authentication control unit 34 and the re-authentication permitting unit 36, and transmits a re-authentication instruction to the re-authentication permitting unit 36 when the authentication fails. The re-authentication permitting unit 36 is configured to encourage (e.g., a message display on a monitor unit 10G) the user to retake the fingerprint image using the biometric authentication sensor 16 only a predetermined number of times. Specifically, the predetermined number of times is a permitted frequency of re-authentication for reducing the number of times for each re-authentication instruction.

The user uses the biometric authentication sensor 16 again to take fingerprint images in accordance with the message. If the authentication is successful within the predetermined number of times, the notification to clear the usage limit is output by the usage limit clearing unit 32 as described above.

Conversely, if the authentication is not successful within the predetermined number of times, the use of service enters a disabled state for that user.

However, the authentication failure may be a case in which, instead of a false user, the user changes the scanning direction or position, or in the case of a finger, the true user uses a different finger thus causing a verification failure. An example of this may be changing from the index finger to the middle finger, or changing the index finger of the right hand to that of the left hand. But even in such a case, the limit for the number of authentications may not be cleared when considering security.

Accordingly, in the present embodiment, a configuration is established in which a differentiation is made between an authentication failure by a false user and an authentication failure by the true user.

Therefore, the true user determining unit 30 is coupled to the storage area control unit 40. Moreover, the storage area control unit 40 is coupled to the verification processing unit 26.

When the true user is not recognized by the true user determining unit 30 and the authentication fails, authentication failure information is transmitted from the true user determining unit 30 to the storage area control unit 40. The storage area control unit 40 obtains the verification characteristic data from the verification processing unit 26 based on the authentication failure information.

As illustrated in FIG. 2, a storage unit 44 includes a plurality of groups 42 in the storage area control unit 40. The obtained verification characteristic data is stored in any of the groups 42. The groups 42 indicated with chain lines are groups 42 that have not been created yet. The storage unit 44 is, for example, a storage device such as a hard disc drive (HDD), or a portable storage medium.

The data classifying unit 46 is provided in the storage area control unit 40. The data classifying unit 46 is coupled to the storage units 44. The data classifying unit 46 has the role of classifying input verification characteristic data into any of the groups 42 so that verification characteristic data in which sameness is recognized is stored in the same group 42.

Specifically, the data classifying unit 46 compares the verification characteristic data with verification characteristic data stored in the groups 42 (referred to below as "stored verification characteristic data" for differentiating when a comparison is made) to determine whether the data has sameness. In addition to when the verification characteristic data and the stored verification characteristic data are an exact match, the verification characteristic data and the stored verification characteristic data are determined to be the same when a certain level of similarity exists therebetween.

When the verification characteristic data is determined to be the same as the stored verification characteristic data belonging to a certain group 42 when the data classifying unit 46 conducts the verification of the verification characteristic data and the stored verification characteristic data, the newly input verification characteristic data is stored in the same group 42.

For example, when the level of similarity of the verification characteristic data and the stored verification characteristic data is equal to or greater than a certain threshold, the verification characteristic data and the stored verification characteristic data are determined to be the same.

The verification processing unit 26 may have the same functions as the functions of the data classifying unit 46. In this case, the determining threshold may the same as that of the verification processing unit 26, or may be a different value.

Unlike the verification processing unit 26, time-dependent changes of the fingerprint image are small since the time difference for taking the comparison object is smaller than that of the data classifying unit 46. Thus, the determination threshold may be set more strictly for that amount.

The data classifying unit 46 is coupled to the storage unit building unit 48. When the verification characteristic data is not determined to be the same as the stored verification characteristic data by the data classifying unit 46, the storage unit building unit 48 creates a new group 42 and stores the newly input verification characteristic data in the new group 42.

The verification characteristic data may be determined to be the same as stored verification characteristic data in two or more groups 42. In this case, the groups 42 are linked to form one group 42. Specifically, although the stored verification characteristic data in the groups 42 were not determined as the same for a reason such as a different obtaining range of the biometric information (fingerprint image), the verification characteristic data is determined to be the same through verification characteristic data in which the obtaining ranges overlap and then the groups 42 may be linked to each other.

As illustrated in FIG. 1, the storage area control unit 40 is coupled to the false user determining unit 50.

The false user determining unit 50 counts the number of the groups 42 managed by the storage area control unit 40. An upper limit (threshold) of the number of groups 42 is previously defined for each form of biometric authentication information. The false user determining unit 50 stores the upper limit and judges whether the number of the groups 42 exceeds the upper limit.

The false user determining unit 50 is coupled to the re-authentication limiting unit 38 of the re-authentication control unit 34. If the number of the groups 42 exceeds the upper limit (threshold), the false user determining unit 50 determines the user as a false user and transmits information indicating that the user is a false user to the re-authentication limiting unit 38. Specifically, when more types of biometric information than one person would have (exceeding the threshold) are inputted, the false user determining unit 50 determines that a multitude of biometric information collected for some type of attack is being used. The value 10 (under the assumption that each person has ten fingers) may be used as the threshold when a finger is used for biometric information such as fingerprints or finger veins. The value 2 (under the assumption that each person has two hands) may be used as the threshold when biometric information based on palm veins, palm patterns, palm shape, or irises. The value 1 (under the assumption that each person has one face) may be used as the threshold when facial authentication is used for biometric information.

The re-authentication limiting unit 38 is coupled to the re-authentication permitting unit 36 and limits re-authentication when the user is determined to be a false user by the false user determining unit 50. For example, the following limitation patterns may be used for limiting re-authentication.

(Limitation pattern 1) Limit software so that authentication request may not be started.

(Limitation pattern 2) Continue authentication limitation until a certain clearing operation is performed by an administrator or the like.

(Limitation pattern 3) When a non-volatile storage region may be used, cut off the power of the biometric authentication device 11 once and do not allow clearing even if the biometric authentication device 11 is rebooted, by registering an authentication limitation state in the non-volatile storage region.

(Limitation pattern 4) Authentication attempts may be limited for each biometric authentication device 11, and authentication attempts may be limited by ID information units in an environment in which IC cards or USB tokens and the like are used.

(Limitation pattern 5) A notification may be made to the administrator indicating the fact that an authentication limitation has occurred with respect to the biometric authentication device 11 or the information ID when communication with the administrator is made possible through some type of communication function in the biometric authentication device 11. For example, notification may be made to the administrator by email using a previously registered email address of the administrator.

The false user determining unit 50 is coupled to the re-authentication permitting unit 36. When the number of the groups 42 does not exceed the upper limit (threshold), the false user determining unit 50 determines that the user is not a false user (high possibility that the authentication failure is by the true user), and outputs an instruction to cancel the counting of the retaking of the biometric information using the biometric authentication sensor 16. In other words, the application of usage limitation is reduced by increasing the number of re-authentications since the user is the true user.

Figure 3:
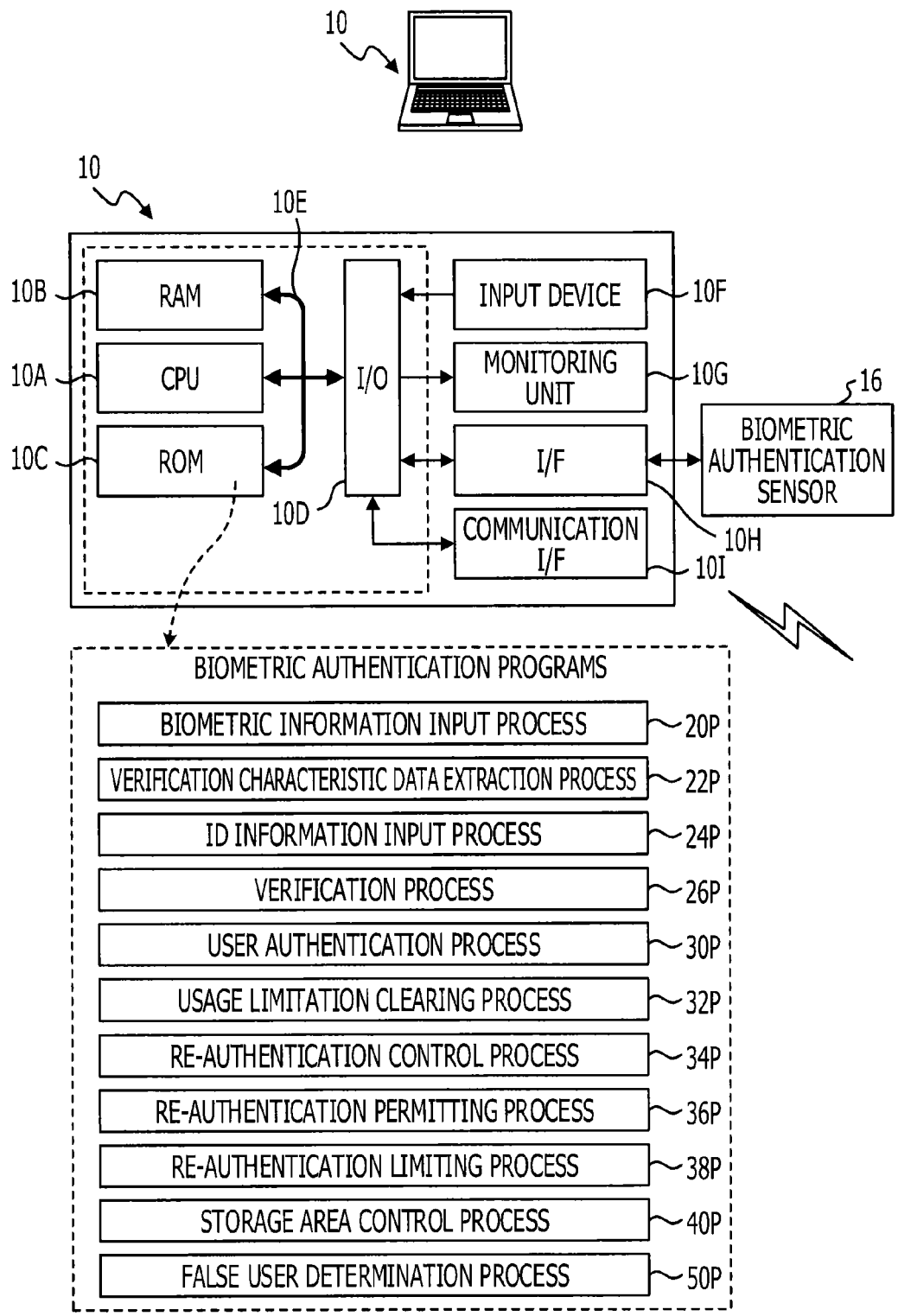
FIG. 3 is a block diagram of a PC including the biometric authentication device according to the first embodiment.

FIG. 3 illustrates a personal computer (PC) 10 having a biometric authentication device 11 according to the first embodiment. The PC 10 includes a microcomputer having a central processing unit (CPU) 10A, a random access memory (RAM) 10B, a read-only memory (ROM) 10C, an I/O 10D, and a bus 10E such as a data bus or a control bus that interconnects the units.

The I/O 10D is coupled to an input device 10F, the monitor unit 10G, and an I/F 10H that is a connection terminal for an external device represented by a USB. The I/O 10D is also coupled to a communication I/F 10I either by a wireless or a wired connection.

A biometric authentication program is executed by a processor such as the CPU or a micro-processing unit (MPU). The biometric authentication program includes a biometric information input process 20P, a verification characteristic data extraction process 22P, an ID information input process 24P, and a verification process 26P. The biometric authentication program executes a user authentication process 30P, a usage limitation clearing process 32P, a re-authentication control process 34P, a re-authentication permitting process 36P, a re-authentication limiting process 38P, a storage area control process 40P, and a false user determination process 50P.

The biometric information input process 20P operates as the biometric information input unit 20 illustrated in FIG. 1.

The verification characteristic data extraction process 22P operates as the verification characteristic data extracting unit 22 illustrated in FIG. 1.

The ID information input process 24P operates as the ID information input unit 24 illustrated in FIG. 1. The verification process 26P operates as the verification processing unit 26 illustrated in FIG. 1. The user determining process 30P operates as the user determining unit 30 illustrated in FIG. 1.

The usage limitation clearing process 32P operates as the usage limit clearing unit 32 illustrated in FIG. 1. The re-authentication control process 34P operates as the re-authentication control unit 34 illustrated in FIG. 1. The re-authentication permitting process 36P operates as the re-authentication permitting unit 36 illustrated in FIG. 1.

The re-authentication limiting process 38P operates as the re-authentication limiting unit 38 illustrated in FIG. 1. The storage area control process 40P operates as the storage area control unit 40 illustrated in FIG. 1. The false user determining process 50P operates as the false user determining unit 50 illustrated in FIG. 1.

The I/F 10F of the present embodiment is coupled to the biometric authentication sensor 16.

The biometric authentication sensor 16 of the present embodiment uses fingerprints as the biometric location for authentication. As a result, a fingerprint authentication sensor is used as the biometric authentication sensor 16; however the present embodiment is not limited as such.

Specifically, the biometric authentication sensor 16 is selected according to the biometric location to be detected. Fingerprints, faces, irises, retinas, veins, palm shape, DNA, voice, signatures, ear auricles and the like are possible biometric locations to be detected.

Outlines of authentication for each of the locations will be explained next.

Fingerprint authentication has a high diffusion rate and is socially reliable but is affected by scratches or dirt.

Facial authentication may be used at a position away from the sensor and is familiar to users, but is unstable due to facial changes.

Iris authentication has a very low rate of false user acceptance and falsification is difficult, but uses a large device.

Vein authentication is very accurate and difficult to falsify but uses a large device.

Palm shape authentication is relatively accurate but uses a large device.

DNA authentication has a very high discrimination system but much time is taken for extraction and analysis.

Voice authentication is psychologically acceptable but is easily affected by health issues and noise.

Signature authentication has a low false user acceptance ratio and is familiar to users, but has a high ratio of true user refusal.

Ear auricle authentication has a stable shape and many characteristics, but is presently in the research and development stage.

As described above, each of the authentication locations has strengths and weaknesses. In the present embodiment, fingerprinting is selected since the device is smaller than other biometric authentication sensors and superior with respect to cost.

A detailed explanation will be omitted since fingerprint authentication is well known in the art. An outline of the mechanism is explained below with reference to FIGS. 4 and 5.

The features of fingerprints are classified into three patterns: a loop fingerprint pattern as illustrated in FIG. 4A, whorl fingerprint pattern as illustrated in FIG. 4B, and an arch fingerprint pattern as illustrated in FIG. 4C. Moreover, as illustrated in FIG. 4D, features such as branch points 64, end points 66, trough lines 68, and ridge lines 70, and the like are visible in fingerprints. The end points 66 and the branch points 64 of the ridge lines 70 may be collectively referred to as minutiae.

Authentication using a fingerprint detected by the biometric authentication sensor 16 includes the use of minutiae (minutiae method) and the comparison of fingerprint images (pattern matching method), and either method may be selected appropriately.

FIGS. 5A to 5D illustrate principles of the verification of taken biometric authentication data (verification data) and previously registered reference data (registered data) from the authentication processing of fingerprints and the like with the principles being substituted onto coordinate axes.

The coordinate axes in FIG. 5A indicate positions of characteristic points A(1), B(1), C(1), and D(1) and indicate directions of the characteristic points A(1), B(1), C(1), and D(1) with arrows of the taken biometric authentication data.

Conversely, the coordinate axes in FIG. 5B indicate positions of characteristic points A(0), B(0), C(0), and D(0) and indicate directions of the characteristic points A(0), B(0), C(0), and D(0) with arrows of the previously registered biometric authentication data.

FIG. 5C is a numerical conversion of the positions (coordinates x, y) and directions (angles in the X-axis plus direction from zero) of the characteristic points in FIGS. 5(A) and 5(B). The characteristic points are, for example, end points 26 illustrated in FIG. 4D, and may be specified as positions and lengthwise directions (orientations) of the end points 26.

The success or failure of the verification is judged based on the number of matches of the numerical values of the characteristic points A to D. Naturally, as the number of matches increase, the accuracy of the matching improves. The degree of matching determination for permission may be set based on a desired level of security.

Hereinbelow, operating procedures according to the first embodiment will be described.

The flow of biometric authentication (including re-authentication) will be described below with reference to flow charts in FIGS. 6 and 7.

Figure 6:
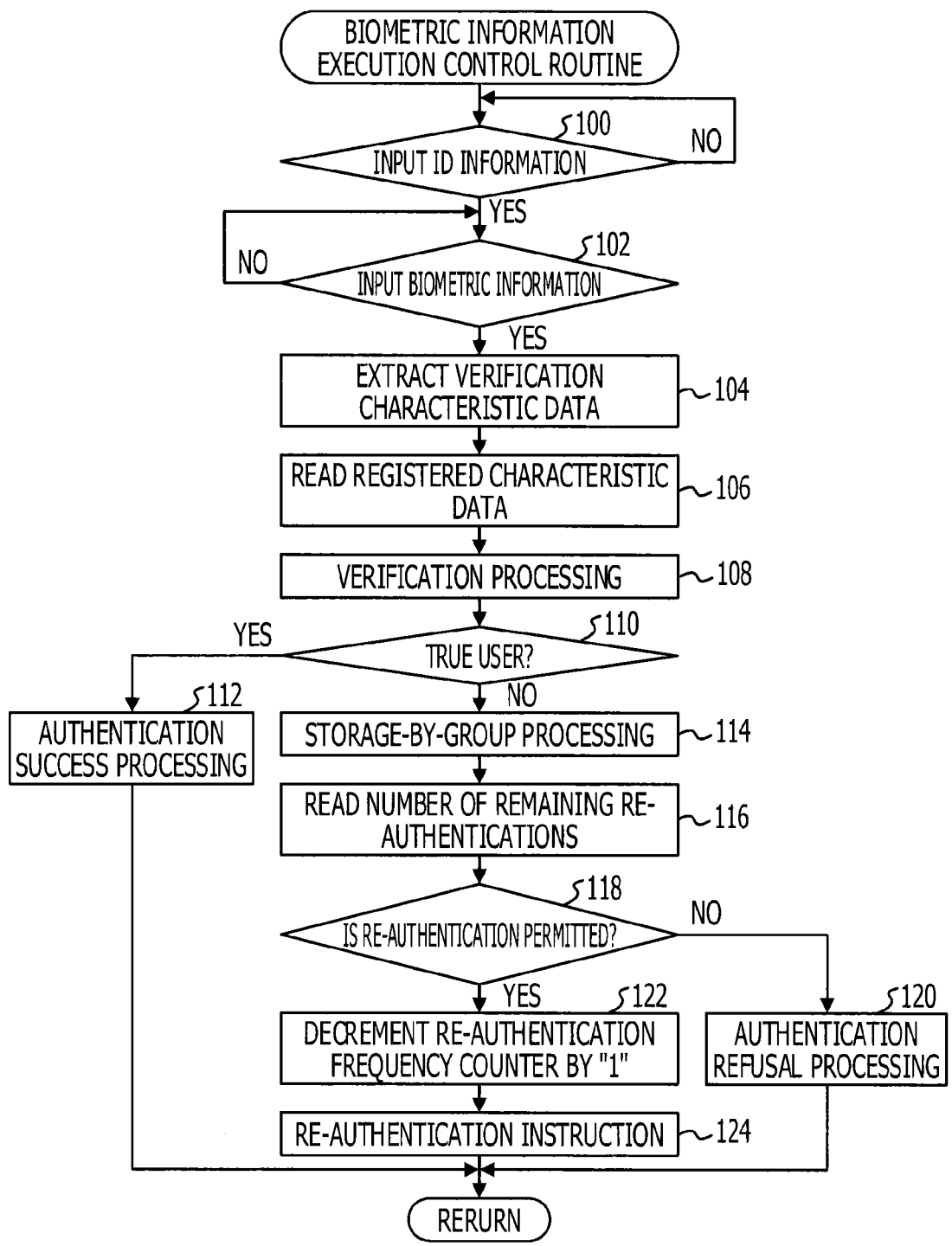
FIG. 6 is a flow chart of a biometric authentication control routine according to the first embodiment.

FIG. 6 is a flow chart of a biometric authentication control routine according to the first embodiment.

In operation 100, whether the ID information has been input into the ID information input unit 24 is determined. If it is determined that the ID information has been input, the routine moves to operation 102 where it is determined whether the biometric information has been input into the biometric information input unit 20. If it is determined that the biometric information has been input into the biometric information input unit 20, the routine moves to operation 104. Although the inputs of the ID information and the biometric information are determined in operation 100 and operation 102 in FIG. 6 in a time sequence, the order may be reversed. Alternatively, parallel processing may be conducted so that the routine moves to operation 104 when the ID information and the biometric information are input regardless of the inputting order.

In operation 104, the verification characteristic data extracting unit 22 extracts the verification characteristic data from the inputted biometric information. Next, the routine moves to operation 106, and the verification characteristic data extracting unit 22 reads the registered characteristic data for comparing with the verification characteristic data from the database unit 28 based on the ID information in the verification processing unit 26.

Next in operation 108, verification processing of the verification characteristic data and the registered characteristic data is conducted by the verification processing unit 26. The object of the biometric information is a fingerprint and the verification processing involves the execution of minutiae matching or pattern matching as described above, or a combination of both (see FIGS. 4 and 5).

Next in operation 110, whether the user is the true user is determined by the true user determining unit 30 and from the verification result. If an affirmative determination is made, the routine moves to operation 112, the successful authentication processing is executed, and the routine is completed. The successful authentication processing includes first notifying the user of the successful authentication and clearing security and the like. As a result, the user is able to use the device (PC 10) that received the authentication and the software (application software and the like) (usage limit clearing unit 32).

In operation 110, when a negative determination (not the true user) is made by the true user determining unit 30, the routine moves to operation 114 and storage-by-group processing is executed by the storage area control unit 40. The storage-by-group processing, which is explained in detail below, includes classifying and storing the verification characteristic data that is the subject of the verification into any of the groups of the plurality of groups 42.

However, even if a negative determination is made (determination that the user is not the true user) in operation 110, an extension of the re-authentication is provided since there is no certainty that the user is a false user. Accordingly, in operation 116, the re-authentication permitting unit 36 then reads the number of remaining re-authentications. The routine moves next to operation 118 where it is determined whether re-authentication is permitted (whether any re-authentications remain).

If a negative determination is made in operation 118, the user is still not able to be determined as the true user even after any number of re-authentications. The routine moves to operation 120 where authentication refusal processing is executed by the re-authentication permitting unit 36, and the routine is completed. The authentication refusal processing includes notifying the user about the authentication failure and guidance to the user for handling the well-intentioned authentication failure, and the like.

If an affirmative determination is made in operation 118, the routine moves to operation 122 where a re-authentication frequency counter of the re-authentication permitting unit 36 is decremented by "1", and then the routine moves to operation 124. The re-authentication instruction is executed in operation 124 and the routine is completed. The re-authentication instruction involves, for example, a notification about encouraging the user to once again use the biometric authentication sensor 16 to take another fingerprint. As a result, when the routine returns to the start (flow chart in FIG. 6), the re-authentication is executed by the user once again executing the fingerprint taking operation.

Figure 7:
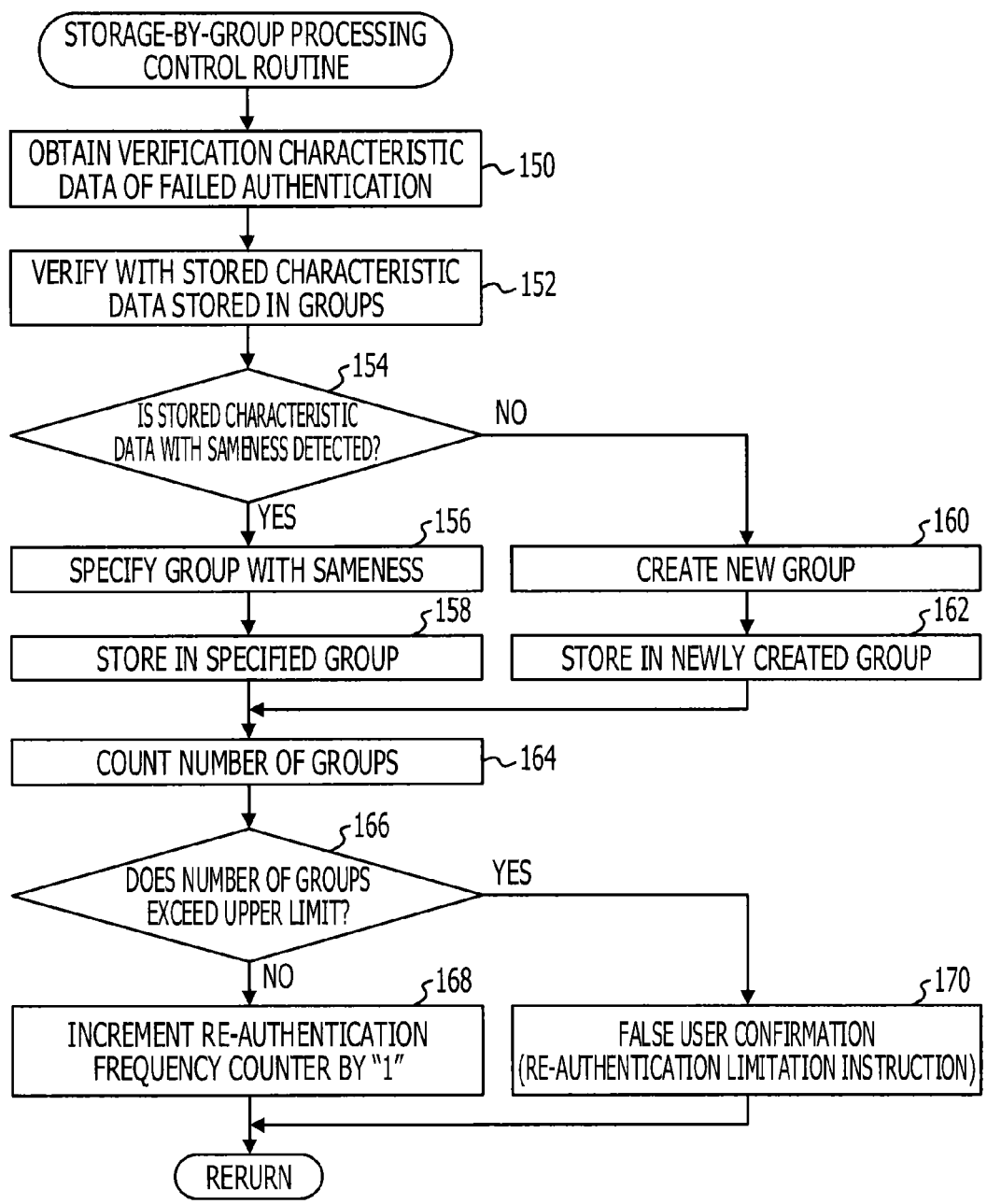
FIG. 7 is a flow chart of a group storage processing control routine in operation in FIG. 6.

FIG. 7 is a flow chart of a group storage processing control routine in operation 108 in FIG. 6. The storage-by-group processing control corresponds to processing by the storage area control unit 40 and the false user determining unit 50 indicated in FIG. 6.

In operation 150, the verification characteristic data of the failed authentication is obtained by the storage area control unit 40. The routine then moves to operation 152 where a verification is made with stored verification characteristic data stored in the groups 42 of the storage area control unit 40. The routine then moves to operation 154.

In operation 154, a determination is made as to whether stored verification characteristic data having sameness (high level of similarity) has been detected based on the verification result. When an affirmative determination is made in operation 154, the routine moves to operation 156 where a group 42 with sameness is specified. The routine then moves to operation 158 where the verification characteristic data is stored in the specified group 42. The routine then moves to operation 164.

When a negative determination is made in operation 154, the routine moves to operation 160 where a new group 42 is created. The routine then moves to operation 162 where the verification characteristic data is stored in the newly created group 42. The routine then moves to operation 164.

In operation 164, the number of the groups 42 is tallied by the false user determining unit 50. The routine then moves to operation 166 where a determination is made as to whether the tallied number of storage units exceeds an upper limit. If a negative determination is made in the operation 166, the user is determined to not be the true user. However, if it is determined that there is verification characteristic data similar to the true user, the routine moves to operation 168 where the re-authentication frequency counter is incremented by "1" by the re-authentication permitting unit 36, and then the routine is completed. As a result, the re-authentication frequency counter value becomes zero due to the re-authentication frequency counter having been decremented by "1" in operation 122 in FIG. 6. As a result, a reduction of the re-authentication frequency limit due to a well-intentioned authentication failure may be avoided.

Conversely, if an affirmative determination is made in operation 166, the user is confirmed to be a false user by the false user determining unit 50. Specifically, if the subject of the biometric information is a finger, the limit of the groups 42 is 10 since there are generally ten types of fingerprints. If the number of storage units is 11 or more at this time, the number of groups 42 based on the verification characteristic data of a finger of a false user is incremented and thus the user is confirmed to be a false user. If an affirmative determination made in operation 166, that is, if the user is confirmed to be a false user, a re-authentication limitation instruction is sent to the re-authentication limiting unit 38. In the first embodiment, the re-authentication limitation instruction immediately renders the authentication as a failure regardless of the remaining number in the re-authentication frequency counter. A number of re-authentications less than the remaining number in the re-authentication frequency counter may be permitted.

Modified Example 1

New and Old Exchange Management

The range of the obtained biometric information is different from that of the first embodiment. As a result (fingertip side and root of finger side and the like), the problem of the authentication retries easily becoming limited by determining that the finger is a different finger even if the fingerprints of the same finger are inputted is resolved.

Moreover, the data classifying unit 46 in the storage area control unit 40 as illustrated in FIG. 2 may calculate an overlapping surface area between the two types of data when a verification determination is made between the verification characteristic data and the stored verification characteristic data.

Specifically, the overlapping surface area is compared with a certain threshold when the verification characteristic data and stored input characteristic data are determined to be the same. When the overlapping surface area exceeds the threshold in the comparison, the stored verification characteristic data with the oldest storage date and time is discarded, and the newly input verification characteristic data is stored. As a result, the capacity (data size) of the groups 42 may be reduced.

Modified Example 2

Date and Time Management

The storage area control unit 40 as illustrated in FIG. 2 may obtain the date and time at which the stored verification characteristic data was stored to manage the obtained date and times in association with the stored verification characteristic data corresponding to the particular date and time.

FIG. 8 is an example of a management table. The management table manages ID information, verification characteristic data, storage data and time, and the groups 42 and the like in association with each other.

Stored input characteristic data in which the storage data and time is not included in a certain period based on the present data and time is discarded. In the example in FIG. 8, data 1 may discarded since the storage data and time of the data 1 is the oldest.

Since only the stored input characteristic data having storage dates within the certain period is subject to the processing by the false user determining unit 50, multiple transactions that were stored within the certain period are subject to processing instead of one transaction from the authentication start until the authentication completion. As a result, an attack pattern may be handled in which re-authentication is started after the user is determined to be a false user and the authentication is interrupted before the authentication limitation is conducted.

Herein a case is assumed in which the storage area control unit 40 monitors transactions from the authentication start until the authentication completion and the status when the authentication is completed is a successful authentication. In this case, stored input characteristic data stored before or during the transaction is discarded. When the authentication is interrupted, the stored verification characteristic data stored during the transaction is held after the transaction is completed. Accordingly, an effect similar to controlling based on the storage data and time may be expected.

Further, a more flexible control may be achieved by combining the control based on the storage date and time and the control based on the transactions.

Modified Example 3

Use of ID Information

The processing by the storage area control unit 40 illustrated in FIG. 2 is described in the first embodiment as using the ID information for each user, but control for each piece of ID information is not conducted. As a result, a plurality of pieces of stored verification characteristic data ID information is included in one group 42.

Specifically, it is conceivable that a malicious false user may conduct an attack aiming for a successful authentication with any user ID information by conducting authentication attempts while changing the ID information. In this case, a malicious attack may be quickly detected by the false user determining unit 50 counting the number of pieces of stored verification characteristic data across a plurality of pieces of ID information.

The number of pieces of ID information included in each group 42 may be counted so that the user is determined as a false user when the number of pieces of ID information exceeds a certain threshold. Alternately, although there are groups having the same biometric information and that are used together with the storage data and time, an attack pattern in which the same biometric information is used and the ID information is continuously switched may be detected by determining the user as a false user when stored input characteristic data with differing ID information is continuously stored. An example of a management table in the storage area control unit 40 is illustrated in FIG. 9.

Conversely, it may be said that an attack pattern which multiple pieces of ID information are switched is generally difficult in an environment in which an IC card or a USB token and the like including ID information is used. In such an environment, the storage area control unit 40 divides the biometric information by ID information to create groups 42, and the false user determining unit 50 counts the number of groups 42 for each piece of ID information and determines that the user is a false user. An example of such a management table is illustrated in FIG. 10. By controlling by ID information, a case in which authentication re-try limitations occur easily due to an increase in the number of groups 42 and the effect of immediately preceding authentication failures by another user may be avoided.

Moreover, since the data classifying unit 46 in the storage area control unit 40 conducts determination processing only on stored verification characteristic data corresponding to the ID information, the processing time for storage may be reduced.

Although one-to-one authentication including an ID information input unit is described in the above processing, the present embodiment is not limited to one-to-one authentication, and may also be applied to one-to-N authentication and to processing that is conducted without using ID information.

Second Embodiment

Hereinbelow, a second embodiment will be explained. Portions having the same structure as those of the first embodiment are provided with the same reference numerals and an explanation of the configuration may be omitted.

Figure 11:
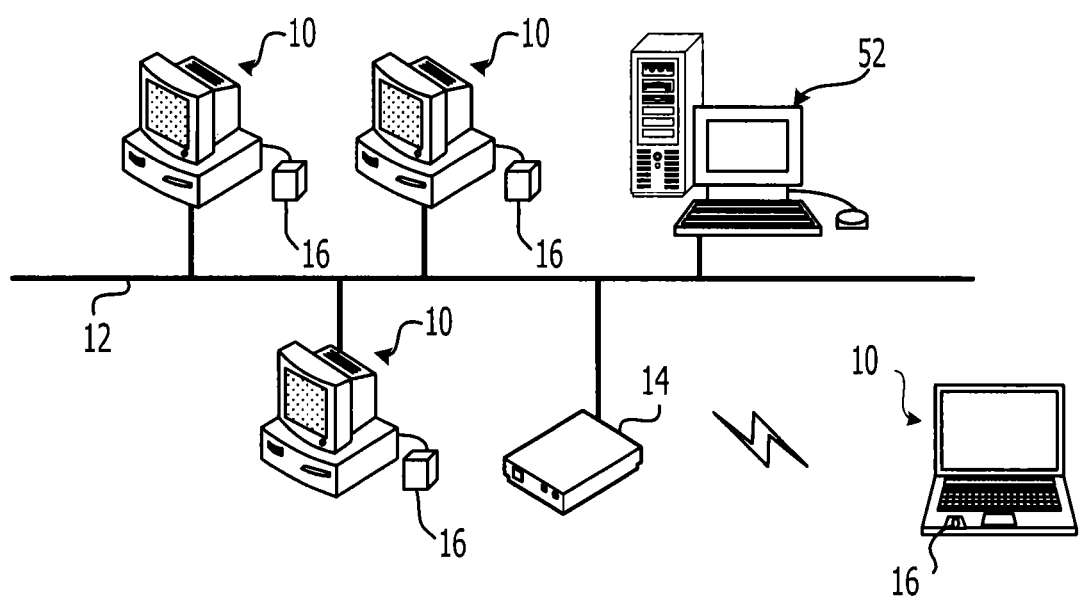
FIG. 11 is a block diagram of a configuration of a biometric authentication system between a PC and a server executed over a network.

A feature of the second embodiment is that processing related to the biometric authentication is implemented in an environment in which PCs 10 that are terminal devices and a server 52 are coupled over a communication line network 12 as illustrated in FIG. 11.

FIG. 11 illustrates a network system centered on the communication line network 12 according to the present embodiment.

A plurality of personal computers (PCs) 10 (three desktops and one laptop in FIG. 11) according to the present embodiment are coupled to the communication line network 12. In FIG. 11, four PCs 10 are coupled, but the number is not limited to four, and thus one to three PCs or five or more PCs may be coupled. The PCs 10 have biometric authentication sensors 16 coupled thereto (or housed therein).

The communication line network 12 may be constructed as a system for communicating information wirelessly through a wireless communication device 14 provided between the PCs 10 (including all types of mobile devices) as terminal devices.

A biometric authentication management control device 52 (also referred to simply as a "server 52") is coupled to the communication line network 12. The server 52 mainly includes the roles of receiving biometric authentication information (verification characteristic data) from the PCs 10 coupled to the communication line network 12 and conducting verification with previously stored registered characteristic data, and notifying the PCs 10 about the success or failure of authentications and about permission for re-authentications.

The biometric authentication sensors 16 are used for determining (authentication success or failure) whether a user is permitted to perform downloading when, for example, a request to download an application is sent from the PC 10 to which the biometric authentication sensor 16 is attached to the server 52.

Figure 12:
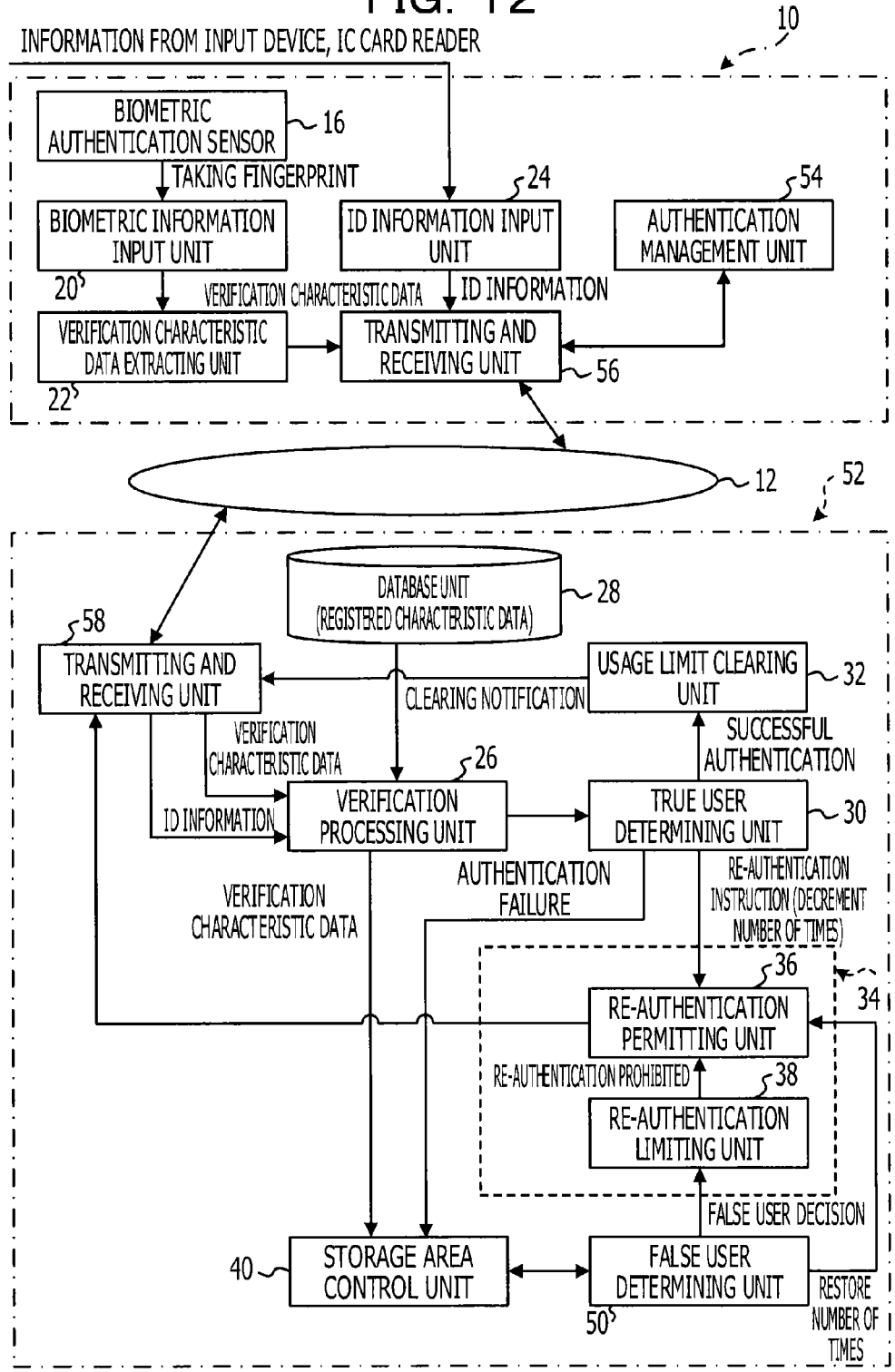
FIG. 12 is a block diagram of functions of a biometric authentication device according to a second embodiment that uses biometric authentication information taken by a biometric authentication sensor to conduct biometric authentication between a PC and a server.

As illustrated in FIG. 12, each PC 10 includes the biometric authentication sensor 16 (either housed therein or as a peripheral device), the biometric information input unit 20, the verification characteristic data extracting unit 22, the ID information input unit 24, and an authentication management unit 54. Each PC 10 includes a transmitting and receiving unit 56 for transmitting inputted ID information and verification characteristic data to the server 52, and receiving verification results based on the biometric authentication from the server 52. The authentication management unit 54 manages device and software usage permissions and the like based on the biometric authentication results.

The server 52 includes the verification processing unit 26, the database unit 28, the true user determining unit 30, the usage limit clearing unit 32, the re-authentication control unit 34 (the re-authentication permitting unit 36, the re-authentication limiting unit 38), the storage area control unit 40, and the false user determining unit 50. The server 52 includes a transmitting and receiving unit 58 for receiving the ID information and the verification characteristic data from the PCs 10, and transmitting the verification results based on the biometric authentication to the PCs 10.

Specifically, the transmitting and receiving units 56 and 58 are present on the respective PC 10 and server 52 sides, and the transmitting and receiving units 56 and 58 transmit and receive data through the communication line network 12.

The PC 10 side transmitting and receiving unit 56 transmits the verification characteristic data and the ID information to the server 52 based on an authentication request by a user. The server 52 side transmitting and receiving unit 58 receives the verification characteristic data and the ID information and the authentication processing is implemented inside the server 52. The PC 10 side transmitting and receiving unit 56 receives the processing results due to the server 52 transmitting to the PC 10 the processing results after the implementation of the verification processing.

The storage area control unit 40 obtains information that specifies the PC 10 that implemented the authentication request from the server 52 side transmitting and receiving unit 58, and stores each piece of information that specifies the PC 10 in the groups 42, and creates new groups 42 to conduct group classification processing of the verification characteristic data.

FIG. 13 is an example of a management table in the server 52 for managing the stored input characteristic data with each piece of information that specifies a PC 10.

As illustrated in FIG. 13, the false user determining unit 50 counts the number (number of groups) of groups 42 managed by the storage area control unit 40 for each piece of information that specifies the PCs 10, and determines that the user is a false user when the number of storage units exceeds the upper limit.

Even with a server 52 in which the number of users is registered and a plurality of authentication requests are conducted at the same time, an effect of false user detection may be achieved by dividing and managing the pieces of information that specify the PCs 10.

It is presumed that, in a biometric authentication system according to the above second embodiment, the authentications of the PCs 10 are limited based on a false user determination received by the authentication control unit 54 on the PC 10 side through the transmitting and receiving units 56 and 58. However, an authentication limitation may be implemented according to units of PCs 10 or units of ID information.

When the user is determined to be a false user by the false user determining unit 50, the user of the ID information to which the information that specifies that PC 10 may be judged as the recipient of an attack. In this case, the re-authentication control unit 34 on the server 52 side limits the authentications by the user of the ID information. For example, a field for authentication limit information may be added to a table for managing user registration information in the database unit 28, and an authentication limit time may be set as valid. When an authentication request with the user ID information having a limited authentication is received from a different PC 10, the validity of the authentication limit information is confirmed along with the time at which the registered characteristic data was obtained from the database unit 28, and the PC 10 side is notified that the authentication is limited without conducting verification processing.

Moreover, the storage area control unit 40 may continue to hold the stored verification characteristic data used when the user is determined to be a false user by the false user determining unit 50 (equivalent to a black list). When the verification characteristic data of an authentication failure that is not recognized as a true user in subsequent verification processing is compared with previously stored verification characteristic data that was determined as a false user and the data is determined as the same, the false user determining unit 50 judges that an attack by a malicious user is occurring. As a result, authentications may be quickly limited when a re-authentication request is received from a malicious user from a different PC 10.

Although the biometric authentication program has been described above as being previously stored in the ROM 10C of the PC 10, the biometric authentication program may be provided in a format stored in a recording medium such as a CD-ROM or a DVD-ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device comprising:
a memory, and
a processor to execute an operation by executing a program stored in the memory, the operation including:
   obtaining biometric information from a user;
   creating verification characteristic data from the biometric information;
   determining whether the verification characteristic data is identified with registration data obtained by the true user;
   storing the verification characteristic data, when it is determined that the verification characteristic data is not identified with the registration data;
   limiting an execution of re-authentications by the user, when a number of different types of a plurality of verification characteristic data stored by the storing exceeds an upper limit; and
   permitting the execution of re-authentications up to a predetermined number of times, when the number of different types of verification characteristic data does not exceed the upper limit.

2. The biometric authentication device according to claim 1, wherein the limiting includes:
   limiting a software to prevent starting of an authentication request.

3. The biometric authentication device according to claim 1, wherein the operation further including:
   obtaining identification number information from the user, wherein the verifying includes:
   obtaining the registration data associated with the identification number.

4. The biometric authentication device according to claim 3, wherein the determining includes:
   determining a level of similarity indicating a probability that a registering person who registered the registered characteristic data is the same person who registered the registered characteristic data is the same person as the user who input the biometric information, the probability increases as the level of similarity increases; and
   comparing the level of similarity with a previously set threshold.

5. The biometric authentication device according to claim 3, wherein the determining includes:
   acquiring distance information indicating a probability that a registering person who registered the registered characteristic data is the same person as the user who input the biometric information, the probability increases as the value of the distance information decreases; and
   comparing the distance information with a previously set threshold.

6. The biometric authentication device according to claim 1, wherein
   the limiting includes prohibiting re-authentication regardless of a remaining frequency of permissions for executing the re-authentications.

7. The biometric authentication device according to claim 1, wherein the operation further including:
   classifying the verification characteristic data into one of the different types based on a similarity between the verification characteristic data and each of the plurality of verification characteristic data stored by the storing.

8. The biometric authentication device according to claim 1, wherein the operation further including:
   when it is determined that the verification characteristic data is not identified with registration data and when the verification characteristic data is identified with one of the plurality of the verification characteristic data, classifying the verification characteristic data into a group to which the one of the plurality of the verification characteristic data belongs; and
   when it is determined that the verification characteristic data is not identified with registration data and when data which is identified with the verification characteristic data does not exist in the plurality of the verification characteristic data, generating a new group and classifying the verification characteristic data into the new group,
wherein the limiting includes limiting the execution when a number of the plurality of groups exceeds the upper limit, and the permitting includes permitting the execution when the number of the plurality of groups does not exceed the upper limit.

9. The biometric authentication device according to claim 1, wherein the operation further including;
when two or more verification characteristic data which are similar to the verification characteristic data are detected from the plurality of verification characteristic data, linking the two or more verification characteristic data to form one group.

10. The biometric authentication device according to claim 8, wherein
the classifying includes specifying an overlapping verification region between verification characteristic data for comparison when determining a level of similarity between the verification characteristic data in which the user is not recognized as the true user and a stored verification characteristic data which is previously stored in any of the groups; and
when the verification characteristic data and the stored verification characteristic data are determined to be the same, the overlapping verification region is compared with a threshold, and
when the overlapping verification region exceeds the threshold, the stored verification characteristic data with an oldest storage date and time is discarded, and a newly input verification characteristic data is stored.

11. A biometric information system, comprising:
a terminal device; and
a biometric authentication server,
wherein the terminal device includes:
a first memory, and
a first processor to execute a first operation by executing a program stored in the memory, the first operation including:
obtaining biometric information from a user;
creating verification characteristic data from the biometric information; and
transmitting the verification characteristic data with the identification number of the user; and
wherein the biometric authentication server includes:
a storage device in which registration data obtained by a true user is stored,
a second memory, and
a second processor to execute a second operation by executing a program stored in the second memory, the second operation including:
receiving the verification characteristic data and the identification number from the terminal device;
determining whether the verification characteristic data is identified with registration data obtained by a true user;
storing the verification characteristic data, when it is determined that the verification characteristic data is not identified with registration data;
limiting an execution of re-authentications by the user, when a number of different types of a plurality of verification characteristic data stored by the storing exceeds an upper limit;
permitting the execution of re-authentications up to a predetermined number of times, when the number of different types of the verification characteristic data does not exceed the upper limit; and
transmitting to the terminal device biometric authentication result information that includes the success or failure of the biometric authentication and the permission or refusal of the re-authentication.

12. A biometric authentication method, comprising:
obtaining biometric information from a user;
creating verification characteristic data from the biometric information;
determining whether the verification characteristic data is identified with registration data obtained by a true user;
storing the verification characteristic data, when it is determined that the verification characteristic data is not identified with registration data;
limiting an execution of re-authentications by the user, when a number of different types of a plurality of verification characteristic data stored by the storing exceeds an upper limit;
permitting the execution of re-authentications up to a predetermined number of times, when the number of different types of the verification characteristic data does not exceed the upper limit.

13. A non-transitory computer-readable recording medium storing a program causing a computer to execute a method, the method comprising:
obtaining biometric information from a user;
creating verification characteristic data from the biometric information;
verifying the verification characteristic data with registration data obtained by a true user to determine whether the user is the true user;
storing the verification characteristic data, when it is determined that the verification characteristic data is not identified with registration data;
limiting an execution of re-authentications by the user, when a number of different types of a plurality of verification characteristic data stored by the storing exceeds an upper limit;
permitting the execution of re-authentications up to a predetermined number of times, when the number of different types of the verification characteristic data does not exceed the upper limit.

14. The biometric authentication device according to claim 1, wherein the permitting includes:
incrementing the re-authentication frequency counter indicating a re-authentication frequency limit by one, when the number of the group does not exceed the upper limit;
determining whether a re-authentication is permitted based on a count value of the re-authentication frequency counter; and
decrementing the re-authentication frequency counter by one and executing a re-authentication instruction to the user, when it is determined that the re-authentication is permitted.

* * * * *

UNITED STATES PATENT AND TRADEMARK OFFICE
CERTIFICATE OF CORRECTION

| | | |
|---|---|---|
| PATENT NO. | : 9,043,941 B2 | Page 1 of 1 |
| APPLICATION NO. | : 13/783867 | |
| DATED | : May 26, 2015 | |
| INVENTOR(S) | : Shigefumi Yamada et al. | |

It is certified that error appears in the above-identified patent and that said Letters Patent is hereby corrected as shown below:

In the Claims

Column 16, Lines 26-28, In Claim 4, delete "who registered the registered characteristic data is the same person who registered the registered characteristic data is the same person" and insert -- who registered the registered characteristic data is the same person --, therefor.

Signed and Sealed this
Eighth Day of September, 2015

Michelle K. Lee
*Director of the United States Patent and Trademark Office*